United States Patent
Funaki

[19]

[11] Patent Number: 5,826,078
[45] Date of Patent: Oct. 20, 1998

[54] JOB RE-EXECUTION SYSTEM AND CONTROLLING METHOD THEREOF

[75] Inventor: Tamio Funaki, Tokyo, Japan

[73] Assignee: NEC Corporation, Tokyo, Japan

[21] Appl. No.: 600,127

[22] Filed: Feb. 12, 1996

[30] Foreign Application Priority Data

Feb. 20, 1995 [JP] Japan .................................. 7-055049

[51] Int. Cl.$^6$ ................................................ G06F 13/38
[52] U.S. Cl. .................... 395/670; 395/181; 395/182.18; 395/183.14
[58] Field of Search ............................. 395/733, 183.14, 395/182.15, 705, 706, 670, 181, 182.18

[56] References Cited

U.S. PATENT DOCUMENTS 5,321,835  6/1994  Tanaka et al. .
5,375,125  12/1994  Oshima et al. ..................... 371/183.14

OTHER PUBLICATIONS

IBM VSE/Advanced Functions "System Management Guide", Version 4 Release 1, IBM Cop., 1989.
"UNIX System V Bible", Commands and Utilities, Stephen Prata, Donald Martin, The Waite group, 1987.
"Recovery in Distributed System Using Optimistic Logging and Checkpointing", David B. Johnson, Willey Zwaenepoel, 1988.

*Primary Examiner*—Kevin A. Kriess
*Assistant Examiner*—Majid A. Banankhah
*Attorney, Agent, or Firm*—Whitham, Curtis, Whitham & McGinn

[57] ABSTRACT

A job re-execution system includes a status output controller for outputting a process status listing of each job, to an output unit. The processes to be re-executed are selected with an input unit. A process controller controls a processor to execute the processes. The processes to be re-executed are also selected by a re-execution controller.

10 Claims, 7 Drawing Sheets

| JOB NAME | PROCESS ID | STATUS | START TIME | TERMINATION TIME | PROCESS LIST |
|---|---|---|---|---|---|
| COMLINK | 23 | NORMAL TERMINATION | 95.03.03 10:10:00 | 95.03.03 10:30:20 | COMPILE, LINK |
| COMRUN | 31 | ABNORMAL TERMINATION | 95.03.03 11:40:10 | 95.03.03 12:25:20 | COMPILE, LINK, RUN |
| EXEC 1 | 50 | EXECUTING | 95.03.03 12:30:00 | – | PROC_A, PROC_B, PROC_C |
| EXEC 2 | 60 | WAITING | – | – | PROC_X, PROC_Y, PROC_Z |

FIG.3

| TIME | JOB NAME | PARENT PROCESS ID | PROCESS NAME | STATUS | INFORMATION |
|---|---|---|---|---|---|
| ≈ | ≈ | ≈ | ≈ | ≈ | ≈ |
| 95.03.03 10:30:20 | COMRUN | 31 | LINK | NORMAL TERMINATION | |
| 95.03.03 11:40:10 | COMRUN | 31 | RUN | STARTED | |
| 95.03.03 12:25:20 | COMRUN | 31 | RUN | ABNORMAL TERMINATION | FILE I/O ERROR IN FILE_DAT |
| 95.03.03 12:30:00 | EXEC 1 | 50 | PROC_A | STARTED | |
| ≈ | ≈ | ≈ | ≈ | ≈ | ≈ |

FIG.4

| JOB NAME | STATUS | START TIME | TERMINATION TIME | |
|---|---|---|---|---|
| COMLINK | NORMAL TERMINATION | 95.03.03 10:10:00 | 95.03.03 10:30:20 | DETAIL |
| COMRUN | ABNORMAL TERMINATION | 95.03.03 11:40:10 | 95.03.03 12:25:20 | DETAIL |
| EXEC 1 | EXECUTING | 95.03.03 12:30:00 | – | DETAIL |
| EXEC 2 | WAITING | – | – | DETAIL |

FIG.5

| PROCESS NAME | STATUS | START TIME | TERMINATION TIME | PARENT PROCESS ID |
|---|---|---|---|---|
| COMPILE | NORMAL TERMINATION | 95.03.03 11:40:10 | 95.03.03 11:45:05 | 31 |
| LINK | NORMAL TERMINATION | 95.03.03 11:45:05 | 95.03.03 11:55:55 | 31 |
| RUN | ABNORMAL TERMINATION | 95.03.03 11:55:55 | 95.03.03 12:25:20 | 31 |

FIG.6

JOB RE-EXECUTION SYSTEM AND CONTROLLING METHOD THEREOF

BACKGROUND OF THE INVENTION

The present invention relates to a system for re-executing a job operating in batch processing when the job is abnormally terminated because of a fault, and, more particularly, to a job re-execution system which can quickly identify where the fault occurs and re-execute the job efficiently. In a computer system, a "job" includes one or more processes defined by a job control program. The job is abnormally terminated, when any fault occurs during an execution of one of its processes (e.g., and thus prior to completion of all processes of the job).

In a conventional system, if any fault occurs during an execution of a process, logging information is outputted to a log file. Before re-execution of the job, an operator analyzes the logging information and determines which processes should be re-executed. Moreover, the operator rewrites the job control program to remove the processes that have been already executed.

In the conventional system, since the operator has to analyze the logging file to determine an occurrence of the abnormal termination and to identify the processes to be re-executed, analysis is time-consuming.

Moreover, in re-executing a job, loading all of the saved files and then re-executing the job from the beginning is disadvantageous since effective execution time is wasted because the processes up to the fault occurrence are executed again and thus are redundant.

Furthermore, simply rewriting the job control program so that only necessary processes are re-executed is disadvantageous since the job control program may be erroneously rewritten.

SUMMARY OF THE INVENTION

In view of the foregoing problems of the conventional system, an object of the present invention is to provide a convenient user-interface system for re-executing a job.

In a job re-execution system including a processor for executing a job having at least one process, according to the present invention, a first unit controls execution of the processor, a second unit outputs a processing status of the job, and a third unit controls a re-execution of the job.

With the unique and unobvious structure of the present invention, a job whose processes are abnormally terminated is easily re-executed.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 3 is a configuration of a job control table 200 of the job re-execution system according to the embodiment of the present invention;

FIG. 4 is a configuration of a log file 320 of the job execution system according to the embodiment of the present invention;

FIG. 5 is a job status listing displayed by an output unit of the job execution system according to the embodiment of the present invention;

FIG. 6 is a process status listing displayed by an output unit of the job execution system according to the embodiment of the present invention.

DETAILED DESCRIPTION OF THE PREFERRED EMBODIMENTS

A job re-execution system in accordance with embodiments of the present invention will be described in detail with reference to the accompanying drawings.

Figure 1:
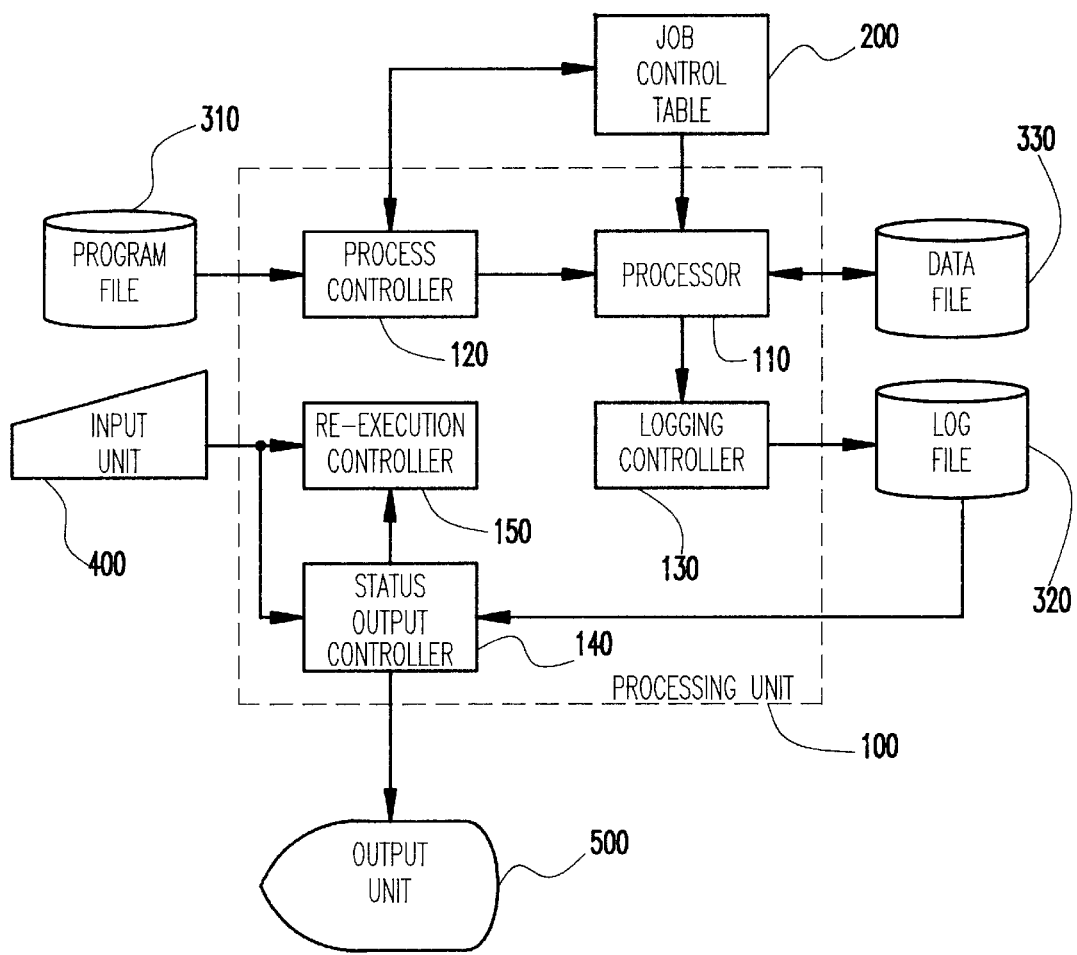
FIG. 1 is a block diagram showing the configuration of a computer system implementing a job re-execution system according to a embodiment of the present invention.

Referring to FIG. 1, a computer system of a first embodiment of the present invention includes a processing unit 100, a job control table 200 for storing a status of each job, a program file 310 for storing programs, a log file 320 for storing logging information, an input unit 400 for inputting data to the processing unit 100 for controlling the jobs, and an output unit 500 for displaying the execution state of the jobs. The processing unit 100 has a processor 110 for executing processes, a process controller 120 for controlling the processor 110, a logging controller 130 for outputting the logging information to the log file 320, a status output controller 140 for controlling the output of the status listings to output unit 500, and a re-execution controller 150 for controlling the re-execution of the jobs.

The job control table 200 is stored in a storage device such as a random access memory (RAM) and/or a magnetic disk drive. The program file 310 stores programs executed as processes in the processor 110. The program file 310 and the log file 320 are stored in an auxiliary storage device such as a magnetic disk drive. The input unit 400 includes, for example, a keyboard, a mouse, and/or a pointing pad. The output unit 500 includes, for example, a display and/or a printer.

Figure 2:
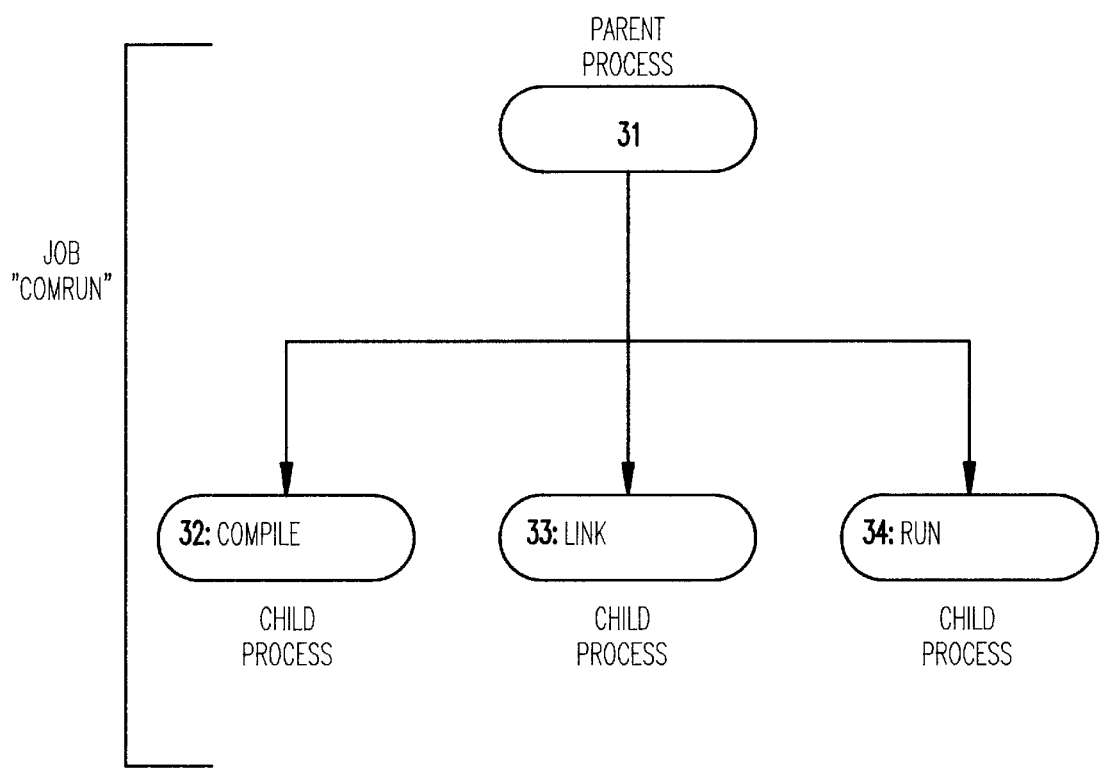
FIG. 2 is an example of a job and the processes therein.
Figure 7:
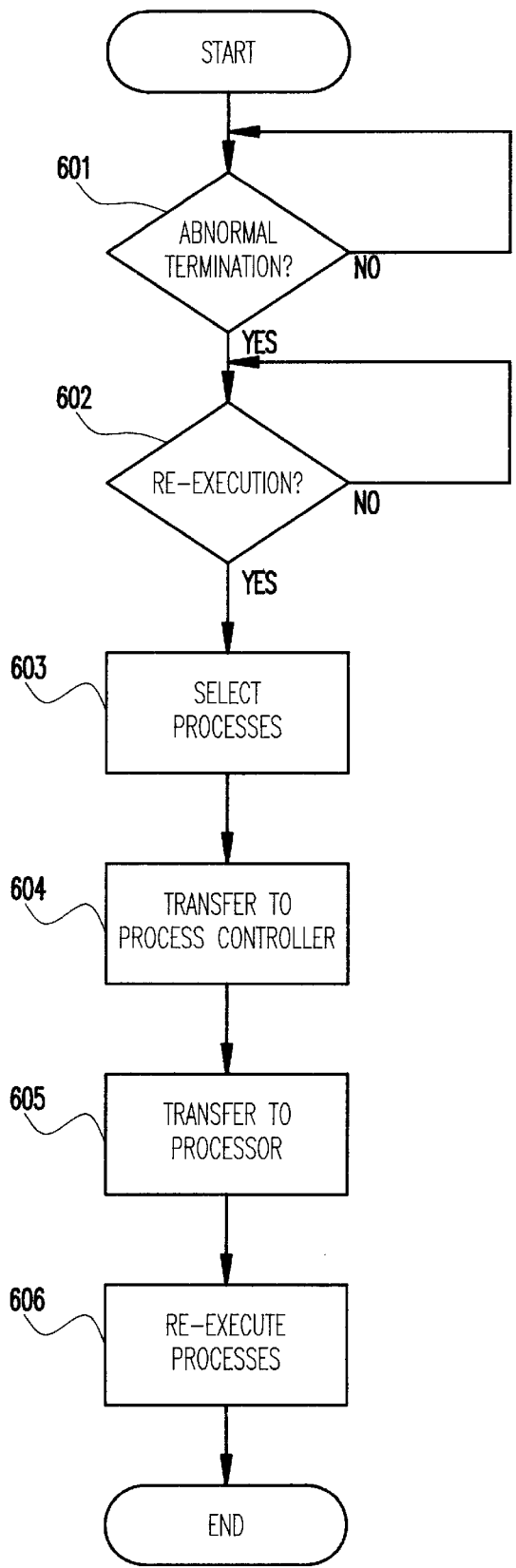
FIG. 7 is a flowchart illustrating a re-execution operation according to the embodiment of the present invention.

Referring to FIG. 2, a job comprises an upper-level "parent" (e.g., senior) process and at least one lower-level "child" (e.g., subordinate) process. The job named "COMRUN" in this case has three child processes (e.g., "COMPILE" "LINK", and "RUN"). Each process has a process number for identifying the process. In this case, the process identification number (process ID) of the parent process is "31" that of "COMPILE" is "32", that of "LINK" is "33", and that of "RUN" is "34".

Referring to FIG. 3, in an example of a configuration of the job control table 200, each entry of the job control table 200 has a job name 210, a process ID 220, a status 230, a start time 240, a termination time 250, and a process list 260. The job name 210 is a name of a job given by either a user or an operating system (OS) for identifying the job. The process ID 220 is the process ID of the parent process. The status 230 is the current status of the job, such as, "normal termination", "abnormal termination", "executing", and "waiting". The start time 240 shows when the job was started and the termination time 250 shows when the job was terminated. The process list 260 shows the child processes constituting the job. Each entry of the job control table 200 is registered by the process controller 120. The job control table 200 is referenced by the processor 110 for execution of the processes.

Referring to FIG. 4, each entry of the log file 320 has a time 327 at when the entry was logged, a job name 321, a parent process ID 322, a process name 326, a status 323 of the process at the time 327, and information 328 with respect to the log. In this case, the information 328 of the process "RUN" shows that a file I/O error has occurred in a file called "FILE_DAT". The log file 320 is logged under the control of the logging controller 130.

Referring to FIG. 1, the processor 110 executes processes under control of the process controller 120. The logging controller 130 outputs logging information to the log file 320 according to outputs (e.g., events) from the processor 110.

The process controller 120 generates one parent process for one job when the job is submitted. Then, the process controller 120 outputs an entry of the job to the job control table 200. The process controller 120 also controls re-execution of jobs.

The status output controller 140 outputs a job status listing and a process status listing to output unit 500 based on the logging information. The re-execution controller 150 controls re-executing jobs according to inputs from the input unit 400.

Referring to FIG. 5, the job status listing displayed in the output unit 500 has, for example, a job name 510, a status 531 of the job, a start time 541 of the job, and a termination time 551 of the job. The status 531 shows the current status of the job such as "normal termination", "abnormal termination", "executing", and "waiting". Each entry of the job status listing remains until the operator purposely deletes the entry. Each entry of the job status listing has a detail information button 570. If the operator activates the detail information button 570, the process status listing of the corresponding job is displayed in the output unit 500.

Referring to FIG. 6, the process status listing displayed in the output unit 500 shows a process name 560, a status 532 of the process, a start time 542 of the process, a termination time 552 of the process, and a parent process ID 520. The status 532 shows the current status of the process such as "normal termination", "abnormal termination", "executing", and "waiting", similarly as described above with respect to the job. Each entry of the process status listing remains until the operator purposely deletes the entry. Each entry of the process status listing has a re-execute button 580. If the operator activates the re-execute button 580, the corresponding process is registered as the process to be re-executed.

Hereinbelow and referring to FIGS. 1–7, the operation of the job re-execution system in accordance with the above-mentioned embodiment of the present invention will be described.

When an "operator", while monitoring the job status listing displayed on the output unit 500 in step 601, has detected that a job has abnormally terminated, the operator identifies a child process abnormally terminated by referring to the process status listing on the output unit 500.

The operator may determine the cause of the abnormal condition for the abnormally terminated child process before the re-execution operation in step 602, for example, by modifying a data file for input, and allocating area for a data file for output. After determining the cause of the abnormal condition, the operator selects the process(es) to be re-executed and activates the re-execute button(s) 580 in step 603.

Upon selection of the process(es) for re-execution, the re-execution controller 150 transfers the process names corresponding to the child processes to be re-executed and the parent process ID for the parent process containing the child processes, to the process controller 120 in step 604.

The process controller 120 identifies a parent process which has the parent process ID transferred by the re-execution controller 150 by referring to the job control table 200. Then, the process controller 120 transfers the process names of the child processes to be re-executed to the processor 110 in step 605. The processor 110 re-executes the job with the selected child process(es) in step 606.

In a second embodiment of the present invention, instead of the operator selecting the process(es) to be re-executed, the re-execution controller 150 selects the process(es) in step 603. In this embodiment, the re-execution controller 150 recognizes the process which has been abnormally terminated, and selects the process(es) to be re-executed by starting from the process having been abnormally terminated through the last process in the job, because the processes are aligned in time (e.g., have a time ordering).

In a third embodiment of the present invention, the status output controller 140 analyzes the log file 320 to determine data files 330 modified by the process which has been abnormally terminated. Thereafter, the status output controller 140 recognizes the process which generates the data files 330 modified by the process which has been abnormally terminated. Then, the status output controller 140 indicates the generating process (e.g., highlighting or marking in red or the like), so that the operator can easily determine the process to be executed from.

In a fourth embodiment of the present invention, in addition to the third embodiment, the re-execution controller 150 selects the process(es) in step 603. In this embodiment, the re-execution controller 150 recognizes the generating process indicated in red by the status output controller 140, and selects the process(es) to be re-executed by starting from the generating process through the last process in the job.

As is apparent from the above description, according to the present invention, since the job status is monitored based on the processing level of the processes contained therein, the operator need not analyze the logging information. An efficient operation results since time is not wasted by the operator analyzing the logging information and processes to be re-executed are selected accurately. Moreover, mistakes in rewriting the job control program are entirely prevented since, unlike the conventional system, rewriting the job control program is unnecessary.

Furthermore, since the processes are selected through the process status listing, the processes abnormally terminated can be quickly and efficiently re-executed without having to re-execute those processes normally terminated.

While the invention has been described in terms of a preferred embodiment, those skilled in the art will recognize that the invention can be practiced with modification within the spirit and scope of the appended claims.

What is claimed is:

1. A job re-execution system, including a processor for executing a job having at least one process to be executed, comprising:

a first unit for controlling execution of said processor;

a second unit for outputting a processing status of the job; and a third unit for controlling a re-execution of the job, wherein said first unit includes a process controller for generating a parent process for a job when the job is input, and said second unit includes a log file for storing logging information during execution of processes, said log file storing at least process identification of the parent process, wherein said second unit further includes a display for displaying a status listing of jobs and processes, and a status output controller for outputting the status listing to said display based on the logging information, wherein said status output controller indicates a process which generates a data file modified by an abnormally-terminated process, said abnormally-terminated process being a process terminated prior to all processes of said at least one process being executed.

2. The job re-execution system as claimed in claim 1, wherein said third unit includes a re-execution controller for controlling re-execution of the job, said re-execution controller selecting processes to be re-executed by starting from the process indicated by said status output controller through a last process in the job.

3. A method of controlling re-execution of a job for a job re-execution system, said method comprising steps of:

executing, by a processor of said job execution system, a job having at least one process to be executed;

outputting logging information to a log file of said job execution system according to an output from said processor;

displaying a status of all processes of the at least one process in the job based on the logging information;

based on said status of each process of said at least one process, selecting for re-execution processes of said at least one process which have been terminated prior to their completion; and re-executing the job with the selected processes, said method further comprising a step of, prior to said selecting step, indicating a process of said at least one process which generates a data file modified by an abnormally-terminated process, said abnormally-terminated process being a process terminated prior to all processes of said at least one process being executed.

4. The method as claimed in claim 3, wherein said selecting step selects said processes for re-execution by starting from said abnormally-terminated process through a last process in the job.

5. The job re-execution system as claimed in claim 1, wherein said third unit includes an input unit for selecting a process to be re-executed.

6. The job re-execution system as claimed in claim 2, wherein said third unit includes an input unit for selecting a process to be re-executed.

7. The method as claimed in claim 3, further comprising a step of providing an input unit for selecting a process to be re-executed.

8. The method as claimed in claim 4, further comprising a step of providing an input unit for selecting a process to be re-executed.

9. The job re-execution system as claimed in claim 1, wherein when the job is terminated due to said abnormally-terminated process, said job restarts from the process which generates the data file modified by said abnormally-terminated process.

10. The method as claimed in claim 3, wherein when the job is terminated due to said abnormally-terminated process, said job restarts from the process which generates the data file modified by said abnormally-terminated process.

* * * * *